(12) United States Patent
Raether

(10) Patent No.: US 9,764,269 B2
(45) Date of Patent: *Sep. 19, 2017

(54) FILTER ELEMENT FOR PULSE CLEANING AND METHODS

(71) Applicant: Donaldson Company, Inc., Minneapolis, MN (US)

(72) Inventor: Thomas D. Raether, St. Louis Park, MN (US)

(73) Assignee: Donaldson Company, Inc., Minneapolis, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/349,096

(22) Filed: Nov. 11, 2016

(65) Prior Publication Data

US 2017/0056803 A1    Mar. 2, 2017

Related U.S. Application Data

(60) Continuation of application No. 14/036,740, filed on Sep. 25, 2013, now Pat. No. 9,504,948, which is a division of application No. 12/919,398, filed as application No. PCT/US2009/034853 on Feb. 23, 2009, now Pat. No. 8,545,585.

(60) Provisional application No. 61/067,173, filed on Feb. 25, 2008.

(51) Int. Cl.
*B01D 46/00* (2006.01)
*B01D 46/52* (2006.01)
*B01D 46/42* (2006.01)

(52) U.S. Cl.
CPC ..... *B01D 46/0068* (2013.01); *B01D 46/4227* (2013.01); *B01D 46/527* (2013.01); *B01D 2271/027* (2013.01)

(58) Field of Classification Search
CPC .. B01D 46/00; B01D 46/0068; B01D 46/521; B01D 46/527; B01D 2271/027
USPC .......................................................... 55/357
See application file for complete search history.

(56) References Cited

U.S. PATENT DOCUMENTS

| | | |
|---|---|---|
| 5,213,596 A | 5/1993 | Kume et al. |
| 5,720,790 A * | 2/1998 | Kometani ............ B01D 39/163 55/497 |
| 6,090,173 A | 7/2000 | Johnson et al. |
| 6,235,195 B1 | 5/2001 | Tokar |
| 6,293,984 B1 | 9/2001 | Oda et al. |
| 8,241,381 B2 | 8/2012 | Braunecker et al. |
| 2002/0073850 A1 | 6/2002 | Tokar et al. |

(Continued)

FOREIGN PATENT DOCUMENTS

| | | |
|---|---|---|
| EP | 1 031 310 | 8/2000 |
| EP | 1 790 409 | 5/2007 |

(Continued)

*Primary Examiner* — T. Bennett McKenzie
(74) *Attorney, Agent, or Firm* — Merchant & Gould P.C.

(57) ABSTRACT

A filter element includes a media pack of Z-media having first and second opposite flow faces and a side wall extending between the first and second flow face. A gasket is secured to the side wall. The gasket has a sealing portion and an attachment portion. The sealing portion has a flat surface at least one inch long and is located between being planar with and 0.5 inches recessed from the first flow face, inclusive. The filter element can be used in a dust collector.

20 Claims, 6 Drawing Sheets

(56) References Cited

U.S. PATENT DOCUMENTS

| | | | |
|---|---|---|---|
| 2005/0284116 A1* | 12/2005 | Duffy | B01D 46/0001 55/497 |
| 2006/0089289 A1 | 4/2006 | Xu et al. | |
| 2007/0186528 A1 | 8/2007 | Wydeven et al. | |
| 2007/0261374 A1 | 11/2007 | Nelson et al. | |
| 2008/0110142 A1 | 5/2008 | Nelson et al. | |
| 2009/0320424 A1 | 12/2009 | Merritt et al. | |
| 2010/0126129 A1 | 5/2010 | Kim et al. | |
| 2010/0242425 A1 | 9/2010 | Swanson et al. | |

FOREIGN PATENT DOCUMENTS

| | | |
|---|---|---|
| JP | 64038121 | 2/1989 |
| JP | 11253727 | 9/1999 |
| JP | 2001300228 | 10/2001 |
| JP | 2002-364335 A | 12/2002 |
| WO | WO 2006/014941 | 2/2006 |

* cited by examiner

FILTER ELEMENT FOR PULSE CLEANING AND METHODS

CROSS REFERENCE TO RELATED APPLICATIONS

This application is a continuation application of U.S. Ser. No. 14/036,740, filed Sep. 25, 2013, which is a divisional application of U.S. Ser. No. 12/919,398, filed 4 Nov. 2010, which is a US National Stage of PCT International Patent application No. PCT/US2009/034853, filed 23 Feb. 2009 in the name of Donaldson Company, Inc., a U.S. national corporation, applicant for the designation of all countries except the US, and Thomas D. Raether, a citizen of the U.S., applicant for the designation of the US only, and claims priority to U.S. Provisional patent application Ser. No. 61/067,173, filed 25 Feb. 2008 and which applications are incorporated herein by reference. To the extent appropriate, a claim of priority is made to each of the above disclosed applications.

TECHNICAL FIELD

This disclosure relates to methods for pulse cleaning filter elements utilizing pressurized gas generators. This disclosure also relates to apparatus including air cleaners, dust filters, and pulse cleaning technology.

BACKGROUND

Air cleaners or dust collector devices sometimes use exhaust gas from a valve and pressure tank (reservoir) to back flush filters. Examples of such air filters assemblies are disclosed in, for example, U.S. Pat. Nos. 6,090,173; 4,218,227; 4,395,269; 5,980,598; 6,322,618; DE 3905113; and Patent Publication U.S. 2006/0112667A1, each of these patent documents being incorporated by reference herein.

Effective cleaning of these filters requires that the exhaust jet fill the opening of the filter to be cleaned. In many implementations, the opening of the filter corresponds to the opening in the tubesheet, in which the filter is mounted. Improvements in pulse cleaning filters are desirable.

SUMMARY

To improve in pulse cleaning of filters, a filter element is provided including a media pack of Z-media having first and second opposite flow faces and a side wall extending between the first and second flow face. A gasket is secured to the side wall. The gasket has a sealing portion and an attachment portion. The sealing portion has a flat surface at least one inch long and is located between being planar with and 0.5 inches recessed from the first flow face, inclusive.

In another aspect, a dust collector is provided including a housing with a dirty air inlet, a clean air outlet, and an interior; a tubesheet in the housing interior having a plurality of openings; a plurality of panel-style filter elements mounted in a respective one of the openings in the tubesheet; and a plurality of blowpipes, with each being oriented to direct a fluid pulse at a respective one of the panel-style filter elements. The filter elements include a media pack of Z-media, a gasket that is between planar with and 0.5 inches recessed from the first flow face, in which the gasket forms a seal with the tubesheet. The blowpipes direct a pulse at an angle that is not normal to a plane of the openings in the tubesheet and not in line with a general direction of filtration flow through the filter element.

In another aspect, a method of cleaning a filter element installed in a dust collector includes providing a filter element, as mentioned above, and periodically pulsing a jet of gas into the downstream flow face to cause at least some particulate material on an upstream side of the Z-media to be removed from the Z-media.

Not all the features described herein must be incorporated in an arrangement for the arrangement to have some selected advantage, according to the present disclosure.

DETAILED DESCRIPTION

Figure 1:
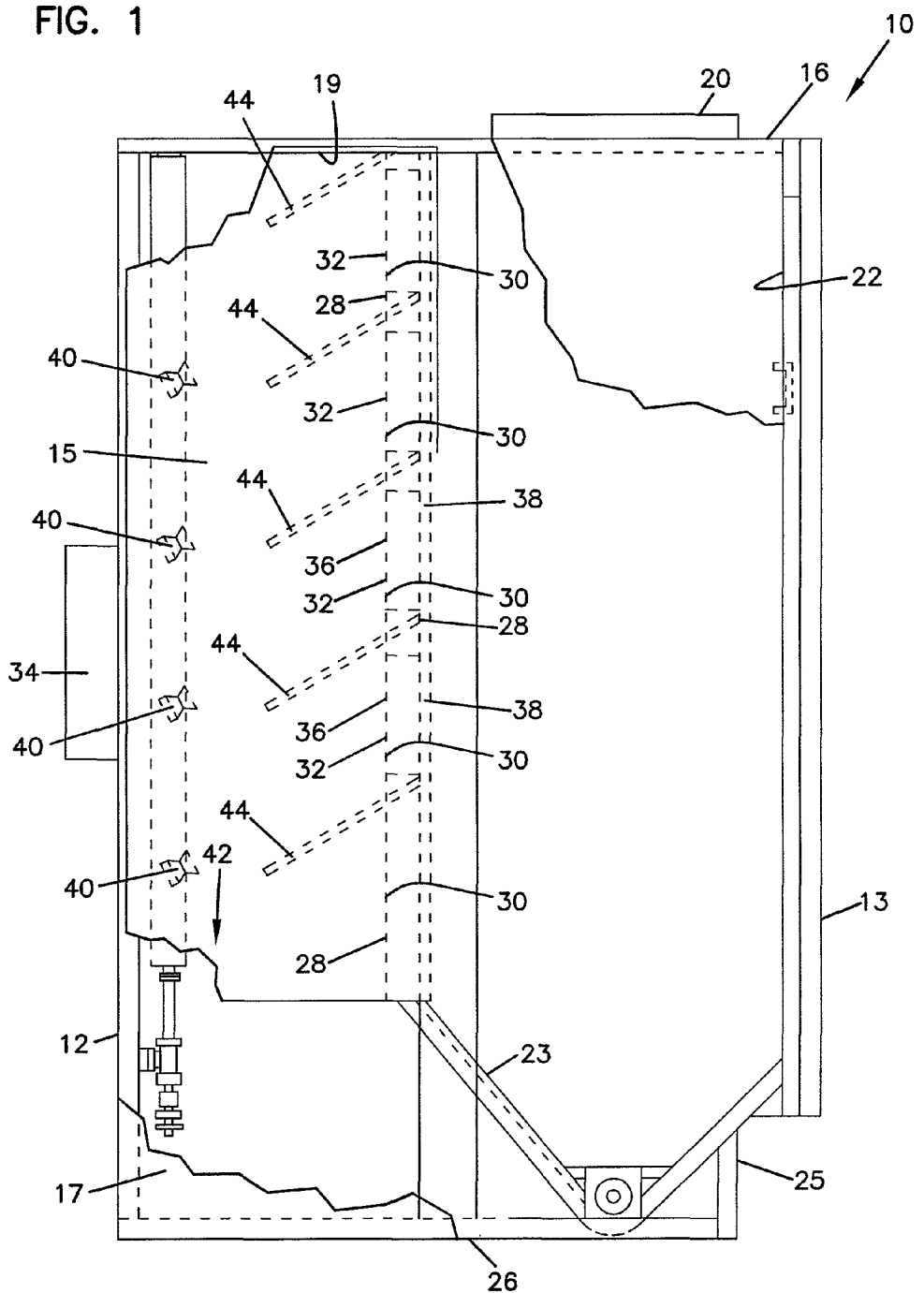
FIG. 1 is a side elevational view, partially broken away, of one embodiment of an air filter system utilizing principles of this disclosure.

A dust filter or air cleaner system is depicted generally at 10 in FIG. 1. The system depicted includes a housing 12 having a side wall panel 17 broken away to illustrate the arrangement of various portions of the assembly. An upper wall panel 16 has an inner wall surface 19. In this embodiment, an air inlet 20 is positioned in the upper wall panel 16 so that the particulate-laden air or other fluid is introduced into an unfiltered (dirty) fluid chamber 22. The unfiltered chamber 22 is defined by an access door 13, the upper wall panel 16, opposing side wall panels 17, a tubesheet 28, and a bottom surface 23 partially defining a collection area or hopper 25. The bottom base panel or frame 26 is secured to the side wall panels 17 in a suitable manner.

As mentioned above, the tubesheet 28 is mounted in the interior of the housing 12. The tubesheet 28 includes a plurality of openings 30. Within each opening 30 is mounted an individual filter element, which in the illustrated embodiment, is a panel-style filter element 32. By the term "panel-style filter element" it is meant an element with filter media in which, in general, fluid to the filtered flows through the filter element in a straight-flow thorough manner. For example, a panel-style filter element can be pleated media, depth media, fluted media, Z-media including a z-filter construction, or mini V-packs. By "Z-media", it is meant media having first and second opposite flow faces with a plurality of flutes, each of the flutes having an upstream portion adjacent to the first flow face (so that the first flow face is an inlet flow face, where air to be filtered flows in) and a downstream portion adjacent to second flow face (so that the second flow face is an outlet flow face, where filter air exits the element), selected ones at the flutes being open at the upstream portion and closed at the downstream portion, while selected ones of the flutes are closed at the upstream portion and open at the downstream portion. The flutes can be straight, tapered, or darted. The flutes extend between the inlet flow face and the outlet flow face. Examples of filter elements with Z-media are found in, for example, U.S. Pat. No. 5,820,646; Patent Publication 2003/

0121845; and U.S. Pat. No. 6,350,291, each of these patent documents being incorporated by reference herein.

The term "z-filter construction" as used herein, is meant to refer to a filter construction in which individual ones of corrugated, folded or otherwise formed filter flutes are used to define sets of longitudinal filter flutes for fluid flow through the media; the fluid flowing along the length of the flutes between opposite inlet and outlet flow ends (or flow faces) of the media. Some examples of z-filter media are provided in U.S. Pat. Nos. 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; and, Des. 437,401; each of these fifteen cited references being incorporated herein by reference.

One type of z-filter media utilizes two specific media components joined together, to form the media construction. The two components are: (1) a fluted (typically corrugated) media sheet; and, (2) a facing media sheet. The facing media sheet is typically non-corrugated, however it can be corrugated, for example perpendicularly to the flute direction as described in U.S. provisional 60/543,804, filed Feb. 11, 2004, incorporated herein by reference.

The fluted (typically corrugated) media sheet and the facing media sheet, together, are used to define media having parallel inlet and outlet flutes; i.e. opposite sides of the fluted sheet operable as inlet and outlet flow regions. In some instances, the fluted sheet and non-fluted sheet are secured together and are then coiled to form a z-filter media construction. Such arrangements are described, for example, in U.S. Pat. Nos. 6,235,195 and 6,179,890, each of which is incorporated herein by reference. In certain other arrangements, some non-coiled sections of fluted media secured to flat media, are stacked on one another, to create a filter construction. An example of this is described in FIG. 11 of U.S. Pat. No. 5,820,646, incorporated herein by reference.

Typically, coiling of the fluted sheet/facing sheet combination around itself, to create a coiled media pack, is conducted with the facing sheet directed outwardly. Some techniques for coiling are described in U.S. provisional application 60/467,521, filed May 2, 2003 and PCT Application US 04/07927, filed Mar. 17, 2004, published Sep. 30, 2004 as WO 2004/082795, incorporated herein by reference. The resulting coiled arrangement generally has, as the outer surface of the media pack, a portion of the facing sheet, as a result. In some instances a protective covering can be provided around the media pack.

The term "corrugated" when used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example formed by corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements generally have an inlet flow end (or face) and an opposite exit flow end (or face), with flow entering and exiting the filter cartridge in generally the same straight through direction. (The term "straight through flow configuration" disregards, for this definition, any air flow that passes out of the media pack through the outermost wrap of facing media.) The term "serviceable" in this context is meant to refer to a media containing filter cartridge that is periodically removed and replaced from a corresponding air cleaner. In some instances, each of the inlet flow end and outlet flow end will be generally flat or planar, with the two parallel to one another. However, variations from this, for example non-planar faces are possible.

In general, the media pack includes appropriate seal material therein, to ensure there is no unfiltered flow of air through the media pack, in extension from front flow face (an inlet flow face) completely through and outwardly from opposite oval face (outlet flow face).

A straight through flow configuration (especially for a coiled media pack) is, for example, in contrast to serviceable filter cartridges such as cylindrical pleated filter cartridges of the type shown in U.S. Pat. No. 6,039,778, incorporated herein by reference, in which the flow generally makes a turn as its passes through the serviceable cartridge. That is, in a U.S. Pat. No. 6,039,778 filter, the flow enters the cylindrical filter cartridge through a cylindrical side, and then turns to exit through an end face (in forward-flow systems). In a typical reverse-flow system, the flow enters the serviceable cylindrical cartridge through an end face and then turns to exit through a side of the cylindrical filter cartridge. An example of such a reverse-flow system is shown in U.S. Pat. No. 5,613,992, incorporated by reference herein.

The term "z-filter media construction" and variants thereof as used herein, without more, is meant to refer to any or all of: a web of corrugated or otherwise fluted media secured to (facing) media with appropriate sealing to inhibit air flow from one flow face to another without filtering passage through the filter media; and/or, such a media coiled or otherwise constructed or formed into a three dimensional network of flutes; and/or, a filter construction including such media. In many arrangements, the z-filter media construction is configured for the formation of a network of inlet and outlet flutes, inlet flutes being open at a region adjacent an inlet face and being closed at a region adjacent an outlet face; and, outlet flutes being closed adjacent an inlet face and being open adjacent an outlet face. However, alternative z-filter media arrangements are possible, see for example US 2006/0091084 A1, published May 4, 2006, incorporated herein by reference; also comprising flutes extending between opposite flow faces, with a seal arrangement to prevent flow of unfiltered air through the media pack.

In operation, fluid, such as air, to be filtered flows into the system 10 through the inlet 20. From there, it flows through the filter elements 32. The filter elements 32 remove particulate material from the fluid. The filtered fluid then flows into the clean air or filtered flow chamber 15. From there, the clean air flows through an outlet 34. Periodically, the filter elements 32 will be cleaned by pulsing a fluid jet, such as a jet of air, from a downstream side 36 of the filter element 32 to an upstream side 38 of the filter element 32. Specifically, a jet of pressurized gas will be directed through individual blow pipes 40, a respective blow pipe being oriented for each of the respective filter elements 32. This will direct the jet through each filter element 32, from the downstream (outlet) side 36 to the upstream (inlet) side 38. This helps to knock debris and particulate from the upstream side 38 of the filter element 32, directing it off the filter element 32 and into a hopper.

Figure 2:
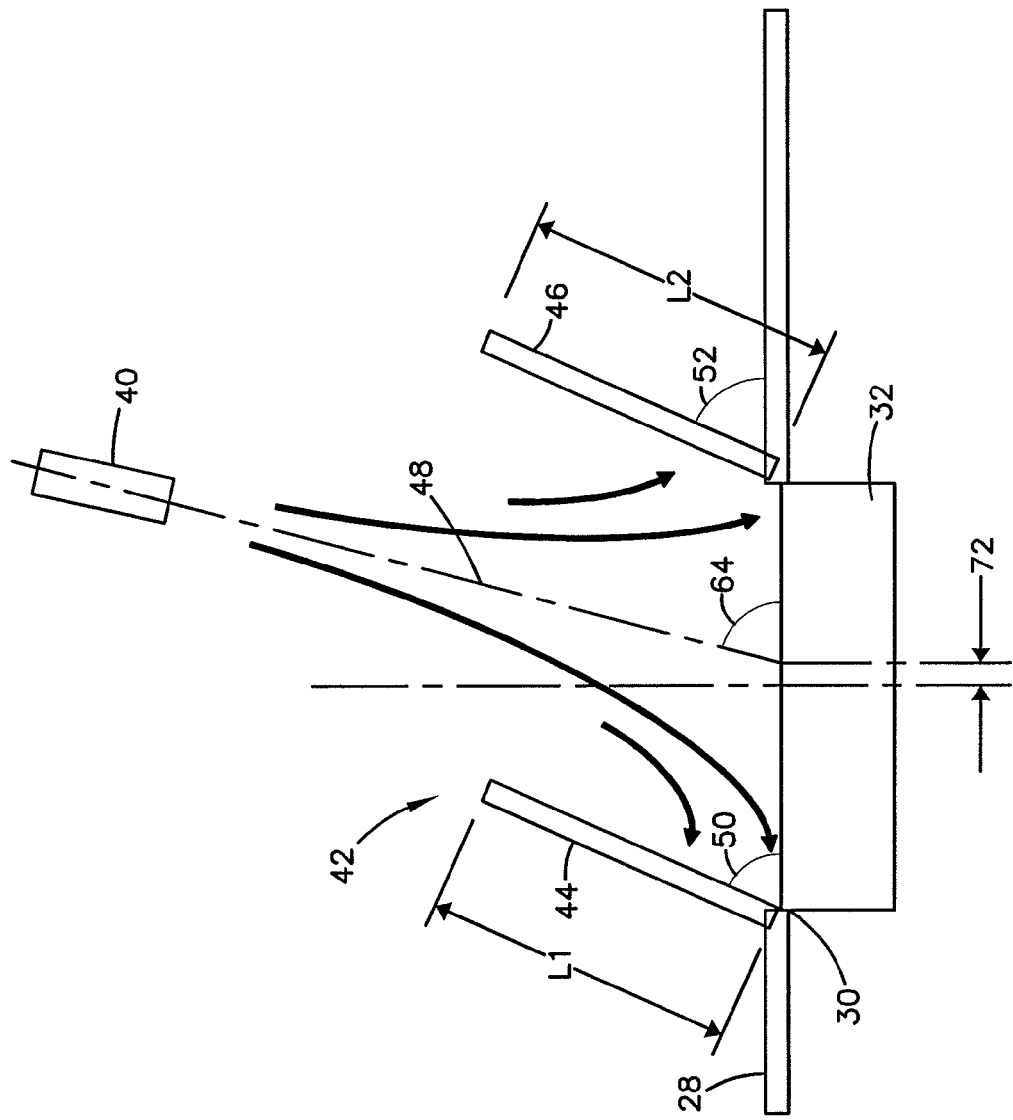
FIG. 2 is a schematic side elevational view illustrating principles of this disclosure.

A schematic illustration of the portion of the system 10 is illustrated in FIG. 2. In FIG. 2, the blow pipe 40 can be seen oriented with respect one the filter elements 32 in the opening 30 in the tubesheet 28. In FIG. 2, it can be seen how the blow pipe 40 is oriented relative to the filter element 32 in a plane 60 (FIG. 3) that contains the respective opening 30 in the tubesheet 28 for the respective filter element 32, such that a pulse that comes from the blow pipe 40 is at an angle that is not normal to a plane of the opening 30 and is not in line with a general direction of filtration flow thorough the filter element 32. By the term "not normal", it is meant non-orthogonal, such as at an acute or obtuse angle relative to the plane 60 that contains the opening 30 for the respective filter element 32. By "not in line with a general direction of filtration flow", it is meant, for a straight-through flow filter, the pulse flow is in a direction that is not parallel to the flow of direction through the filter element 32. By directing the fluid pulse at the filter element 32 at such an angle 64, the exhaust jet, which expands at a predictable angle, creates a diameter D2 (FIG. 3) larger in one direction that a diameter D1 that is typically used in the prior art.

While the illustrated embodiment shows only a single blowpipe 40 corresponding to a single filter element 32, it should be understood that in many implementations, there are more than one blowpipe 40 for each element 32.

In some embodiments, at least a portion of the pulse can be trapped by using an optional accumulator arrangement 42. The accumulator arrangement 42 captures the flow of the pulse from the blow pipe 40. In one embodiment, the accumulator arrangement 42 includes a least one plate, shown as first plate 44, oriented on the clean air side 15 of the tubesheet 28 and adjacent to the opening 30 of the tubesheet 28. The first plate 44 may be any type of wall, sheet metal, panel, baffle, rigid plastic, or generally non-porous solid structure that is oriented to the adjacent respective opening in the tubesheet 28 for the respective filter element 32.

In certain implementations, the accumulator arrangement includes a second plate 46 oriented at an opposite end of the opening 30 at the tubesheet 28 from the first plate 44. In the embodiment shown, the first and second plates 44, 46 are aligned with the general direction of the pulse, but the angle does not necessarily need to be the same as the angle of the pulse direction. FIG. 2 illustrates a center line of the direction of the pulse at 48. The first plate is mounted at a first angle 50 relative to the tubesheet 28. The first angle is within about 5° of center line 48 of a direction of the pulse. Similarly, the second plate 46 is mounted at a second angle 52 relative to the tubesheet 28. The second angle 52 is within about 5° of the center line 48 of a direction of the pulse. In some embodiments, the first angle 50 and the second angle 52 are equal. In other embodiments, the first angle 50, and second angle 52 are unequal. In some embodiments, the first angle 50 and the second angle 52 are within 30° of being parallel to each other. The angles 50, 52 of the plates 44, 46 are selected based upon the angle 64 of the pulse.

As illustrated in FIG. 2, the first plate 44 has length $L_1$, which is preferably no longer than three times the length of the respective opening 30 in the tubesheet 28. This is because primary flow pressure loss increases with increase in length. Preferably, the length $L_1$ has a length that is between 25-75% of a length of the respective opening 30 in the tubesheet 28. In preferred embodiments, the blowpipe 40 is spaced no more than 30-40 times of an inside diameter of the blowpipe from the tubesheet to eject the pulse.

In FIG. 2, reference numeral 72 shows the offset between the pulse center line 48 and a center of the filter element 32. This shows how the center line 48 of the pulse is not always in alignment with the center of the filter element 32.

In one embodiment, the plate that is closer to the respective blow pipe 40 (in the embodiment illustrated, the second plate 46) has a length that is shorter than the other plate (in this example, the first plate 44). In one embodiment, this shorter plate 46 has a length that is not less than 5% of a length of the respective opening 30 in the tubesheet 28. This arrangement is advantageous because of both material savings and pressure loss associated with pumping air flow.

Figure 3:
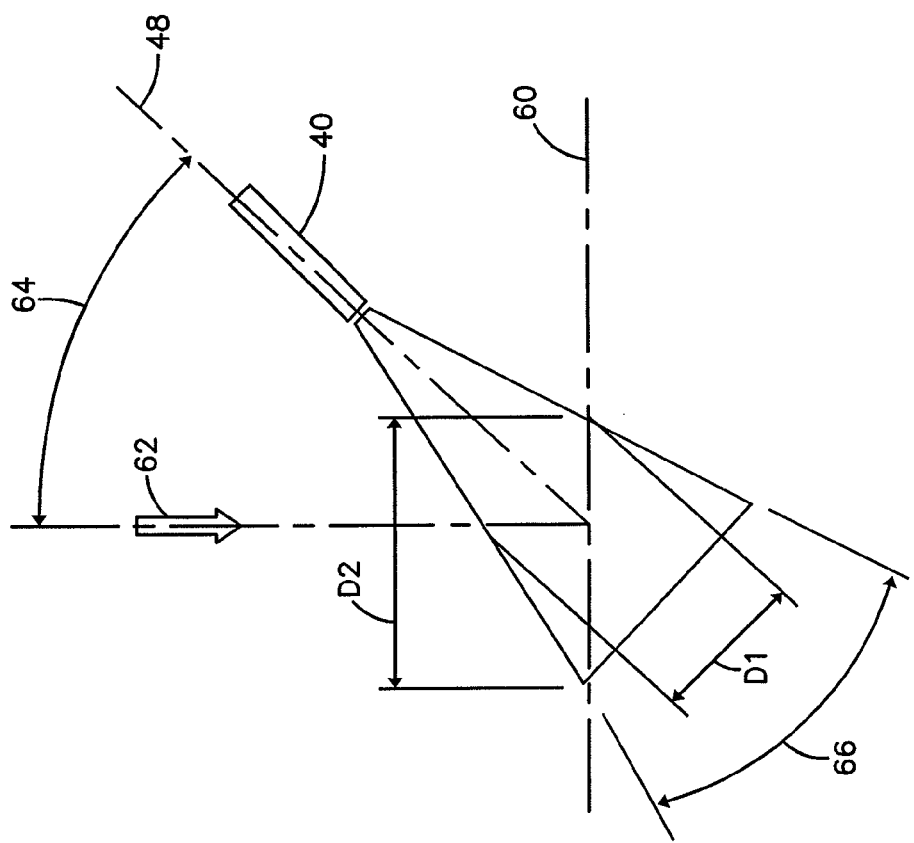
FIG. 3 is a schematic diagram illustrating principles of this disclosure.

Attention is directed to FIG. 3. In FIG. 3, the arrow 62 represents the prior art pulse direction. In the prior art, the standard pulse direction is directed perpendicular or normal to the plane 60 that contains the tubesheet 28. Angle 64 shows the angle that is offset to the vertical direction, or the direction from the standard, prior art direction shown by arrow 62. A typical pulse expansion is shown at angle 66, from the blow pipe 40. As explained above, the exhaust jet from the blow pipe 40 creates a diameter D2, covering a larger surface area in the opening 30 of tubesheet 28, versus diameter D1 that comes from the exhaust jet shown at arrow 62 in the prior art arrangement.

One useful arrangement has the following angles and dimensions: Angle 64 is 25°-35°, preferably 29°; angles 50 and 52 are equal and 18°-25°, preferably 22°-23°; first and second plates 44, 46 are parallel; offset 72 is about 1 inch; length L1 is about 16-20 inches, preferably about 18.75 inches; and length L2 is about 6-10 inches, preferably about 8.0 inches.

Figure 4:
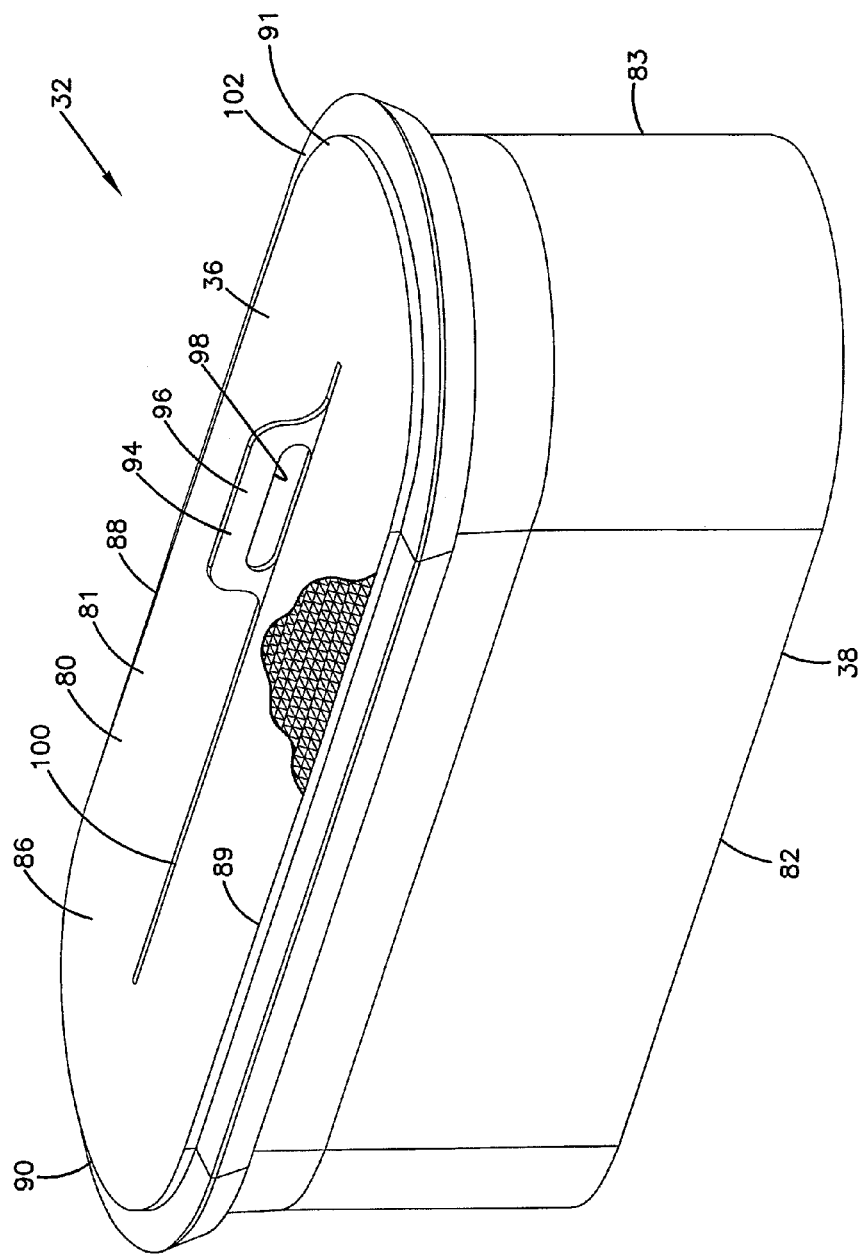
FIG. 4 is a perspective view of a filter element usable with the air filter system of FIG. 1, designed in accordance with principles of this disclosure.
Figure 5:
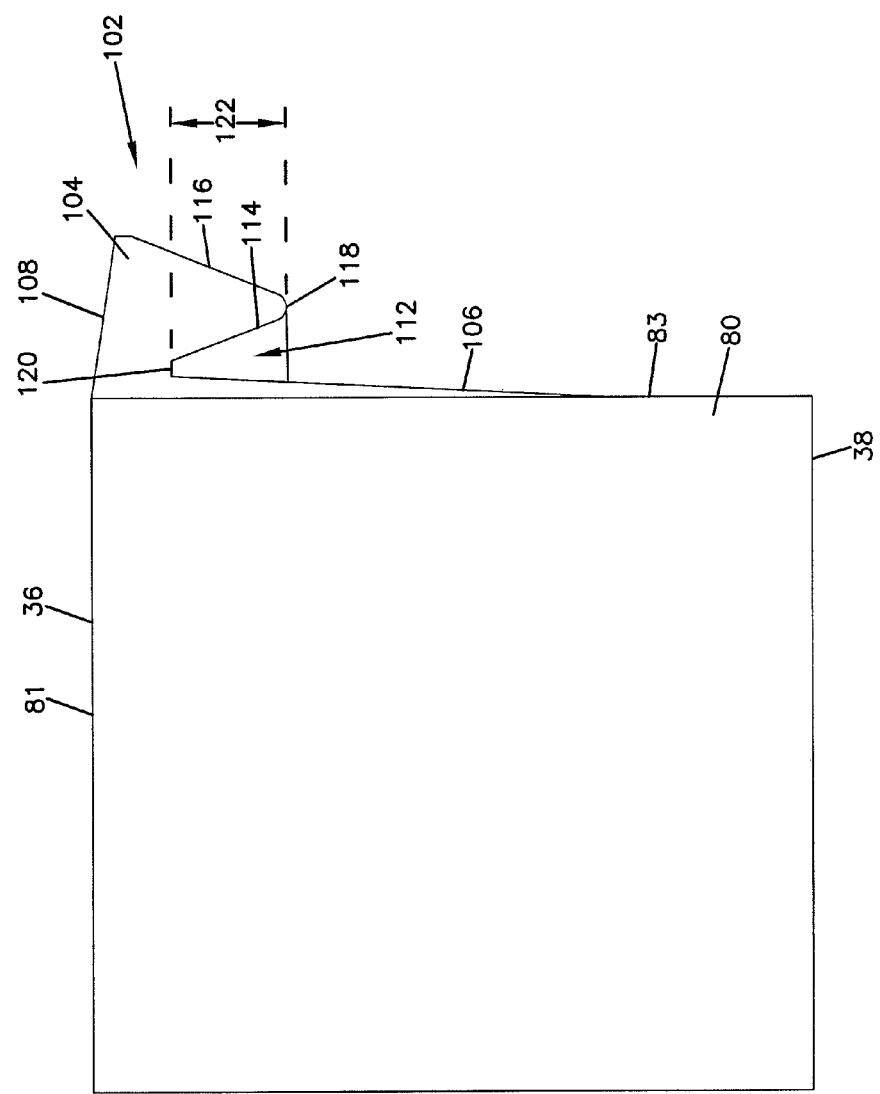
FIG. 5 is an enlarged, partial cross-sectional view of a portion of the filter element of FIG. 4.
Figure 6:
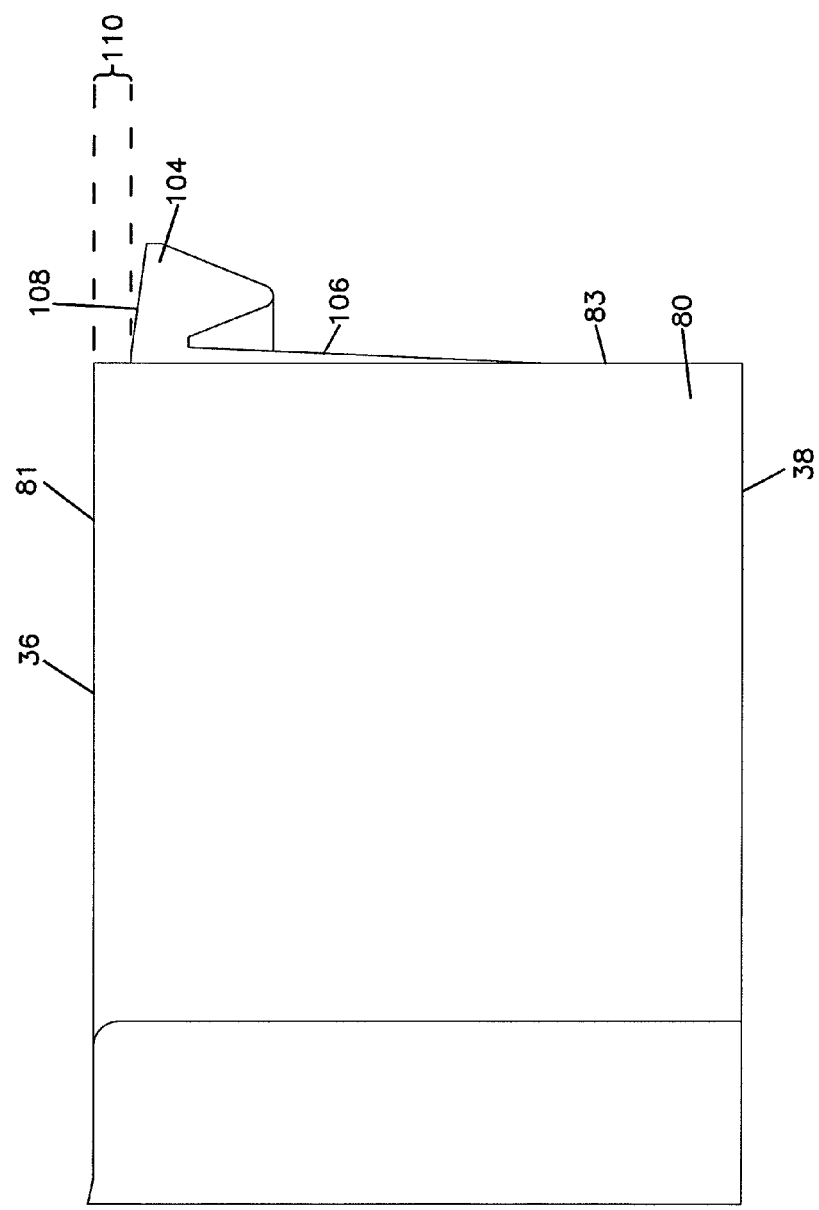
FIG. 6 is an alternate embodiment of the filter element depicted in FIG. 5.

FIGS. 4-6 depict useful embodiments for the filter element 32 in the collector housing 12. Filter element 32 includes a media pack 80 of Z-media. The media pack 80 has first and second opposite flow faces 81, 82 and a side wall 83 extending between the first and second flow faces 81, 82. In implementation, the first flow face 81 also corresponds to the downstream (outlet) flow face 36, while the second flow face 82 corresponds to the upstream (inlet) flow face 38.

In the embodiment shown, the media pack 80 includes a non-cylindrical pack of media that is a coiled construction 86. In alternative embodiments, the media pack 80 can be a construction of stacked Z-media. The coiled construction 86 has an overall cross-sectional shape that can be oval or race track-shaped. In the embodiment shown, the media pack 80 is race track-shaped in that it has a pair of straight parallel sides 88, 89 joined by rounded ends 90, 91. In other embodiments, the media pack 80 can be round or rectangular, or rectangular with rounded corners.

In general, the filter element 32 includes a handle member 94 extending axially from the first flow face 81. In this embodiment, the handle member 94 includes a projection 96 defining an open aperture 98 sized to accommodate a human hand. The filter element 32 can be made generally in accord with U.S. Pat. No. 6,235,195, incorporated herein by reference.

In this embodiment, the filter element 32 includes a central core 100 embodied as a flat board. The media pack 80 is coiled around the core 100. The core 100 projects above the first flow face and defines the handle member 94 for manipulating the filter element 32.

The filter element 32 further includes a gasket 102. The gasket 102 is secured to the side wall 83. In preferred implementations, the gasket 102 is molded directly to the side wall 83 of the media pack 80. In other embodiments, the gasket 102 can be pre-made through, for example, an extrusion process and then attached to the side wall 83 of the media pack 80 by glue or an adhesive.

In accordance with principles of this disclosure, the gasket 102 is secured to the side wall 83 so that it is between planar with and 0.5 inches recessed from the first flow face 81, inclusive. In other words, the gasket 102 is either completely even with (planar with) the first flow face 81 or it is located no greater than 0.5 inches recessed away from the first flow face 81, inclusive. By the term "inclusive" it is meant that the gasket 102 can be even with the flow face 81 or it can be 0.5 inches recessed from the first flow face 81, or it can be anywhere within the range of even with and 0.5 inches recessed from the first flow face 81. By locating the gasket 102 at this location, it positions the media pack 80 in the tubesheet 28 in a way that allows the downstream flow face 36 to be generally even with the tubesheet 28. This results in more effective pulse cleaning of the filter element 32 because less energy is lost when the downstream flow face 36 is even with the tubesheet 28.

In the embodiment shown, the gasket 102 has a sealing portion 104 and an attachment portion 106. The attachment portion 106 is the part of the gasket 102 that is directly secured to the side wall 83 of the media pack 80. The sealing portion 104 is the part of the gasket 102 that is compressed against the tubesheet 28 to form a seal with the tubesheet 28.

In the embodiment shown, the sealing portion 104 has a flat surface 108. The flat surface 108, in practice, is at least one inch long. In FIG. 5, it can be seen how the flat surface 108 is planar with the first flow face 81. In the embodiment of FIG. 6, the flat surface 108 is recessed a distance 110 from the first flow face 81. This distance is not greater than 0.5 inches, inclusive.

In reference again to FIG. 5, the gasket 102 defines an undercut 112 between the attachment portion 106 and the sealing portion 104. As can also be seen in FIG. 5, the sealing portion 104 includes a first angled surface 114 and a second angled surface 116. The first and second angled surfaces 114, 116 slant toward each other to meet an apex 118. The first angled surface 114 and the attachment portion 106 are joined at a base 120. The first angled surface 114 extends from the attachment portion 106 at the base 120 to the apex 118, while the second angled surface 116 extends from the flat surface 108 to the apex 118. The undercut 112 is defined as a gap between the first angled surface 114 and the attachment portion 106. In the embodiment shown, the attachment portion 106 includes an extension that extends from the surface 108 down past the apex 118.

In the embodiment shown, the undercut 112 is defined by a vertical distance 122 from the base 120 to the apex 118, or end of the first angles surface 114 shown. This dimension 122 is at least 0.5 inch.

The flat surface 108 slopes downward and away from the first flow face 81 at an angle that is greater than zero degrees and less than 20 degrees.

In use, the element 32 is installed in dust collector 10 in a manner such that the downstream flow face 36 is even with the tubesheet 28 or is less than 0.5 inches recessed from the tubesheet 28, inclusive. The filter element 32 can be cleaned by periodically pulsing a jet of fluid or gas into the downstream flow face 36 to cause at least some particulate material on the upstream side 38 of the Z-media pack 80 to be removed from the media pack 80.

General Principles

A filter element can include a media pack comprising opposite first and second flow faces with flutes extending in a direction therebetween; a sidewall extending between the first and second flow faces; one of the first and second flow faces being an inlet flow face and the other being an outlet flow face; and a gasket secured to the sidewall; the gasket having a sealing portion and an attachment portion; the sealing portion having a flat surface at least one inch long and being between planar with and 0.5 inches recessed from the first flow face, inclusive.

The media pack may be non-cylindrical.

The media pack may be oval shaped.

The media pack may be racetrack shaped having a pair of straight parallel sides joined by rounded ends.

The gasket can define an undercut between the attachment portion and the sealing portion; the sealing portion can include first and second angled surfaces slanting toward each other to meet at an apex; the first angled surface can extend from the attachment portion to the apex; the second angled surface can extend from the flat surface to the apex; the undercut may be defined as a gap between the first angled surface and the attachment portion; and the first angled surface and the attachment portion may be joined by a base.

A vertical distance from the base to an end of the first angled surface can be at least 0.5 inch.

The flat surface may slope downward and away from the first flow face at an angle of greater than 0 degrees and less than 20 degrees.

The filter media may be a coiled construction.

A handle member may extend axially from the first flow face.

The handle member may include a projection defining an open aperture sized to accommodate a human hand.

A central core can be included, with the media pack coiled around the core.

The central core may project above the first flow face and define a handle member for manipulating the filter element.

A dust collector can include a housing including a dirty air inlet, a clean air outlet, and an interior; a tubesheet in the housing interior having a plurality of openings; a plurality of panel-style filter elements, each filter element being mounted in a respective one of the openings in the tubesheet; each of the filter elements including: a media pack comprising opposite first and second flow faces with flutes extending in a direction therebetween; a sidewall extending between the first and second flow faces; one of the first and second flow faces being an inlet flow face and the other being an outlet flow face; and a gasket secured to the sidewall; the gasket having a sealing portion and an attachment portion; the sealing portion having a flat surface at least one inch long and being between planar with and 0.5 inches recessed from the first flow face, inclusive; the gasket forming a seal with the tubesheet; a plurality of blowpipes; each blowpipe being oriented to direct a fluid pulse at a respective one of the panel-style filter elements at an angle that is: not normal to a plane of the openings in the tubesheet; and not in line with a general direction of filtration flow through the respective panel-style filter.

The media pack can be racetrack shaped having a pair of straight parallel sides joined by rounded ends; and the filter media is a coiled construction.

A central core can be included with the media pack being coiled around the core; and the central core can projects above the first flow face and defines a handle member for manipulating the filter element.

The gasket can define an undercut between the attachment portion and the sealing portion; the sealing portion including first and second angled surfaces slanting toward each other to meet at an apex; the first angled surface extending from the attachment portion to the apex; the second angled surface extending from the flat surface to the apex; the undercut being defined as a gap between the first angled surface and the attachment portion; and the first angled surface and the attachment portion being joined by a base.

A method of cleaning a filter element installed in a dust collector can include providing a filter element of z-media sealed against a tubesheet in a dust collector housing; the filter element having an inlet flow face and an outlet flow face with flutes in between and being sealed against the tubesheet so that the outlet flow face is between planar with and 0.5 inches recessed from tubesheet, inclusive; and periodically pulsing a jet of gas into the outlet flowface to cause at least some particulate material on an upstream side of the z-media to be removed from the z-media.

The above are examples utilizing principles of this disclosure. Not all the features described herein must be incorporated in an arrangement for the arrangement to have some selected advantage, according to the present disclosure.

I claim:

1. A filter element comprising:
    (a) a media pack of filter media comprising opposite first and second flow faces with flutes extending in a direction therebetween; a sidewall extending between the first and second flow faces;
        (i) the first flow face being an outlet flow face, and second flow faces being an inlet flow face;
    (b) a handle member extending axially from the first flow face; and
    (c) a gasket secured to the sidewall; the gasket having a sealing portion and an attachment portion;
        (i) the sealing portion having a flat surface that is either planar with or recessed from the first flow face;
            (A) the flat surface sloping downward and away from the first flow face at an angle greater than 0 and less than 20 degrees;
        (ii) the sealing portion including first and second surfaces meeting at an apex;
            (A) the first surface extending from the attachment portion to the apex;
            (B) the second surface extending from the flat surface to the apex;
            (C) the first surface and the attachment portion being joined by a base;
            (D) the attachment portion extending from the base and spaced from the base along the sidewall in a direction toward the second flow face to provide an end of the attachment portion along the sidewall; and
        (iii) the gasket having an undercut, the undercut being defined by a vertical distance from the base to the apex.

2. A filter element according to claim 1 wherein the media pack is non-cylindrical.

3. A filter element according to claim 2 wherein the attachment portion extends past the apex to provide the end of the attachment portion closer to the second flow face than the base is to the second flow face.

4. A filter element according to claim 1 wherein the media pack is oval shaped.

5. A filter element according to claim 1 wherein the media pack is racetrack shaped having a pair of straight parallel sides joined by rounded ends.

6. A filter element according to claim 1 wherein the filter media is a coiled construction.

7. A filter element according to claim 6 further comprising a central core with the filter media coiled around the core.

8. A filter element according to claim 7 wherein the core projects above the first flow face and defines the handle member.

9. A filter element according to claim 1 wherein the filter media includes non-coiled sections of fluted media secured to flat media stacked on one another.

10. A filter element according to claim 1 wherein the vertical distance is at least 0.5 inch.

11. A filter element according to claim 1 wherein the handle member includes a projection defining an open aperture sized to accommodate a human hand.

12. A filter element according to claim 1 wherein the flat surface is recessed from the first flow face no more than 0.5 inch.

13. A filter element comprising:
    (a) filter media comprising a coiled construction and having opposite first and second flow faces with flutes extending in a direction therebetween; a sidewall extending between the first and second flow faces;
        (i) the first flow face being an outlet flow face, and second flow faces being an inlet flow face;
    (b) a handle member extending axially from the first flow face;
    (c) a gasket secured to the sidewall; the gasket having a sealing portion and an attachment portion;
        (i) the sealing portion having a flat surface that is either planar with or recessed from the first flow face;
            (A) the flat surface sloping downward and away from the first flow face at an angle greater than 0 and less than 20 degrees;
        (ii) the sealing portion including first and second surfaces meeting at an apex;
            (A) the first surface extending from the attachment portion to the apex;
            (B) the second surface extending from the flat surface to the apex;
            (C) the first surface and the attachment portion being joined by a base;
        (iii) the gasket having an undercut, the undercut being defined by a vertical distance from the base to the apex; and
    (d) a central core with the filter media coiled around the core.

14. A filter element according to claim 13 wherein the media pack is non-cylindrical.

15. A filter element according to claim 13 wherein the attachment portion extends from the base along the sidewall and past the apex to provide an end of the attachment portion closer to the second flow face than the base is to the second flow face.

16. A filter element according to claim 13 wherein the media pack is oval shaped.

17. A filter element according to claim 13 wherein the media pack is racetrack shaped having a pair of straight parallel sides joined by rounded ends.

18. A filter element according to claim 13 wherein the vertical distance is at least 0.5 inch.

19. A filter element according to claim 13 wherein the handle member includes a projection defining an open aperture sized to accommodate a human hand.

20. A filter element according to claim 13 wherein the flat surface is recessed from the first flow face no more than 0.5 inch.

* * * * *